INVENTOR.
GIANNI A. DOTTO
BY Robert Cannio
ATTORNEY

INVENTOR.
GIANNI A. DOTTO
BY
ATTORNEY

Oct. 10, 1967 G. A. DOTTO 3,345,915
SNAP ACTION FLUID ESCAPEMENT FOR OBTAINING
INTERMITTENT ROTARY MOTION
Filed Oct. 12, 1964 6 Sheets-Sheet 4

INVENTOR.
GIANNI A. DOTTO
BY
ATTORNEY

INVENTOR.
GIANNI A. DOTTO

ATTORNEY

INVENTOR.
GIANNI A. DOTTO

//+ # United States Patent Office 3,345,915
Patented Oct. 10, 1967

3,345,915
SNAP ACTION FLUID ESCAPEMENT FOR OBTAINING INTERMITTENT ROTARY MOTION
Gianni A. Dotto, Dayton, Ohio, assignor to P. R. Mallory & Co., Inc., Indianapolis, Ind., a corporation of Delaware
Filed Oct. 12, 1964, Ser. No. 403,051
16 Claims. (Cl. 91—50)

ABSTRACT OF THE DISCLOSURE

A fluid actuated escapement which translates a substantially constant fluid flow input into a rapid, intermediate rotary motion output.

The present invention relates to an escapement, more particularly to an escapement imparting timed, intermittent or step-by-step snap rotary motion outputs from a substantially constant input. Such timed, intermittent rotary motion escapements are employed to periodically actuate control devices such as a timing means which regulates a timed sequence of operations. A timing means of this type may be employed in washing machines and other devices using controlled timing devices.

In a device of this general nature it is desirable that the escapement be actuated after a predetermined interval of time has elapsed. The escapement operates a control device such as an actuating means having as a component thereof a series of cam operated switches. The escapement with which the present invention is concerned is of the type having a substantially constant fluid flow input which is translated by the escapement into an intermittent, snap rotary motion output. The device would necessarily include a fluid source, a displaceable means responsive to a fluid flow, a ratchet, a ratchet wheel and an actuating means affixed to a rotatable shaft to periodically actuate a plurality of switch means.

In control timers using escapements, it is desirable that the timer incorporate a means which allows the timer to be manually operable so as to modify the duration or sequence of operation by either shortening specific operation or by skipping over the operation entirely. For this purpose, it is understood that the timer can be provided with a manual means coupled to the rotatable shaft which is capable of modifying the sequence of operation of the timer by relocating the shaft.

Several escapements presently available provide an intermittent or step-by-step snap rotary motion output from a substantially constant rotary motion input. These presently available escapements are used in conjunction with a plurality of cam operated switching means to form an integral timing device for a device such as a washing machine or the like. These several escapements utilize means for storage of energy during a storage cycle and means for subsequently releasing said stored energy during a release cycle. Generally, the means utilized to store the energy is a spring means that is either compressed or expanded thereby storing energy. When the spring means is released from its compressed or expanded position, the energy so stored provides a driving torque for a ratchet wheel and its associated driving means. Normally, the power for actuating such an escapement is provided by an electrical prime mover such as an electrical motor.

The use of an intermittent driving means provides the facility of making and breaking switch contacts at sufficient velocity so as to prevent the contacts from being damaged by arcing therebetween. The intermittent release of stored energy over a relatively short period of time as compared to the storage time is transferred to a ratchet wheel and then to a cam operated means which controls the sequential operation of a series of switch means.

The present invention provides an intermittent driving means whereby the spring means and the electrical prime mover are replaced by a simple, efficient, inexpensive, accurate, and effective spring biased displaceable fluid sensitive means and associated valve. The constant fluid flow input is translated by the spring biased displaceable fluid sensitive means and associated valve to an intermittent driving force which actuates a cam operated means that in turn controls the sequential operation of a plurality of switching means.

It is therefore, an object of the present invention to provide a novel fluid flow translating means, the fluid flow means utilized to translate a constant fluid flow input to a rapid, intermittent rotary motion output.

A further object of the present invention is to provide an intermittent drive means utilizing a novel combination of a displaceable fluid sensitive means and a valve.

Yet another object of the present invention is to provide an escapement having uniform torque advancement characteristics that is also simple to fabricate and assemble.

Still another object of the present invention is to provide a simple, efficient, and practical escapement for timing devices.

A further object of the present invention is to provide an escapement in which each impulse or jump has a precise amount of travel without any over-travel.

Yet another object of the present invention is to provide an escapement device for actuating a multi-contact electric switching means, the escapement being inexpensive and accurate in construction, and more positive in action than preceding escapement means.

Still another object of the present invention is to provide an escapement means associated with a plurality of multicontact electrical switches, the escapement means having optimum reliability characteristics afforded by a construction having a minimum of parts.

A further object of the present invention is to provide an escapement that translates a constant fluid flow into an intermittent movement having high torque.

The present invention in another of its aspects relates to novel features of the instrumentalities of the invention described therein for teaching the principal object of the invention and to the novel principles employed in the instrumentalities of the invention described therein for teaching the principal object of the invention and to the novel principles employed in the instrumentalities whether or not these features and principles may be used in the object and/or in the said field.

With the aforementioned objects enumerated, other objects will be apparent to those persons possessing ordinary skill in the art. Other objects will appear in the following description, appended claims, and the appended drawing. The invention resides in the novel construction, combination, arrangement, and cooperation of elements as hereinafter described and more particularly as defined in the appended claims.

The appended figures of the drawing illustrate several novel and different embodiments of the present invention constructed to function in the most advantageous modes devised for the practical application of the basic principals involved in the hereinafter described invention.

Generally speaking, the present invention relates to means and methods of providing a timed, intermittent or step-by-step snap rotary motion output from a substantially constant fluid flow input. More particularly, the present invention pertains to a fluid actuated, preferably water actuated, escapement. The escapement includes a housing divided into two separate and distinct chambers by a displaceable fluid sensitive means such as a diaphragm or a piston or other suitable displaceable means. A first chamber has at least one fluid intake aperture, preferably an intake orifice, coupled to a fluid source having a predetermined rate of fluid flow. A second aperture in the housing provides access to the second chamber. A follower means projects through the second aperture into the first chamber. The follower means is fixedly coupled to the displaceable means. The fluid flow from the source is fed to the first chamber at a constant rate of flow. The displaceable means responds to the fluid flowing into the first chamber by being displaced by the fluid accumulated in the first chamber. Since the follower means is fixedly coupled to the displaceable means, the follower means is displaced in a like manner. A valve means is coupled to the follower means, however, the valve means is actuated from a closed position to an open position by the follower means after a predetermined displacement of the follower means. The fluid accumulated in the first chamber is thereafter discharged from the first chamber through the open valve means to an exhaust orifice. The discharge of the fluid from the first chamber allows the follower means to snap back to its initial position.

A ratchet wheel is coupled to the follower means in such a manner that the ratchet wheel is actuated in the clockwise direction by the return of the follower means to its original position. The follower means actuates the ratchet wheel through a predetermined arcuate displacement in accordance with the snap back motion of the follower means. The follower means may be coupled to a knee action means which stores energy when the follower means is displaced from its initial position and releases the stored energy when the follower means returns to its initial position. The release of the energy stored by the knee action means actuates the ratchet wheel in a clockwise direction through a predetermined arcuate displacement.

The valve means used with the diaphragm type of escapement includes a hollow cylinder means and a cup shaped means that slidably interfits with the hollow cylinder means. The cup shaped means is fixedly coupled to the follower means. A spring bias means biases the cup. The cup is displaced with the follower means thereby compressing the spring bias means and storing energy. After the cup is displaced through a predetermined distance, the cup engages the hollow cylinder means. A further displacement of the cup displaces the hollow cylinder means with which the cup is now engaged from an initial closed position with the first chamber to an open position. The opening of the valve means allows fluid accumulated in the first chamber to be discharged therefrom through the exhaust orifice.

The second embodiment of the present invention is wherein a displaceable fluid sensitive means such as a piston means is slidably mounted within a housing. The piston means divides the housing into two separate and distinct chambers. The first chamber has at least one intake aperture, the aperture or orifice is coupled by any suitable fluid conductive means to a source of constant fluid flow. A second aperture in the housing permits access to the second chamber and to the piston means. A follower means fixedly coupled to the piston means extends through the second aperture. As fluid is accumulated in the first chamber, the piston means and the associated follower means are displaced from an initial position. A valve means coupled to the piston means is actuated from a closed position to an open position by the piston means after a predetermined displacement of the piston means. The fluid accumulated in the first chamber discharges from the chamber through the open valve means. The discharge of the fluid allows the follower means and the piston means to snap back to their respective initial positions thereby closing the valve means preventing further discharge of fluid from the first chamber. A hinged, knee action means is coupled to the follower means, the follower means upon initial displacement of the knee action means stores energy therein. A ratchet wheel is rotatably coupled to the output of the knee action means. When the follower means returns to its initial position, the energy stored in the knee action means is released thereby actuating a ratchet wheel through a predetermined arcuate displacement in accordance with the release of energy stored in the knee action means.

Referring now to FIGURES 1–5 of the drawing which illustrate the preferred embodiment of the present invention comprising escapement means 10 and associated switch actuating means 11. The escapement means 10 comprises a pressure sensitive means 12, a valve means 13, a follower means 14, a ratchet means 15, a ratchet wheel 16, a stop pawl 17, and a cam carrying shaft 18.

Figure 1:
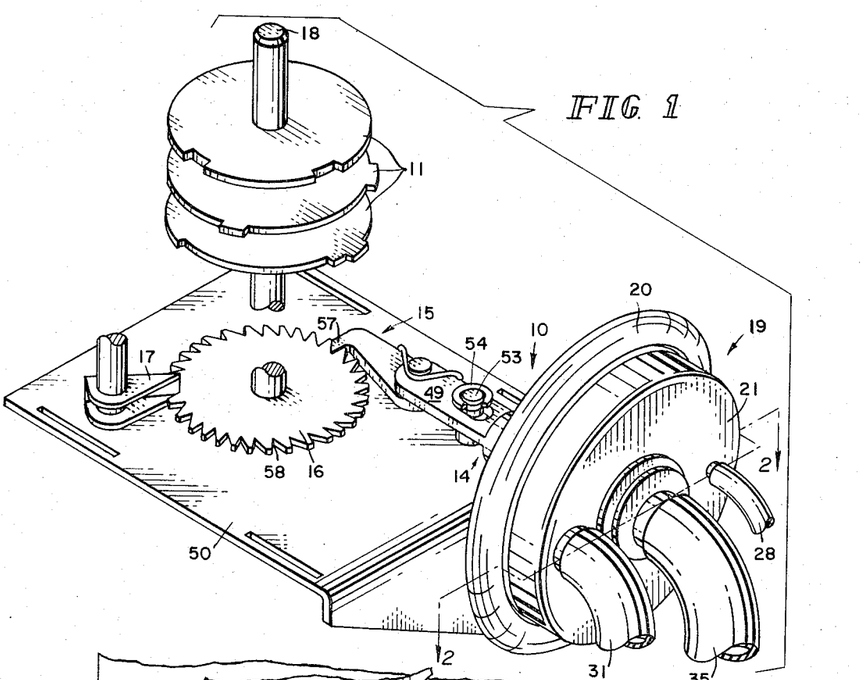
FIGURE 1 is a perspective view of the present invention illustrating the escapement and associated switch actuating means.
Figure 2:
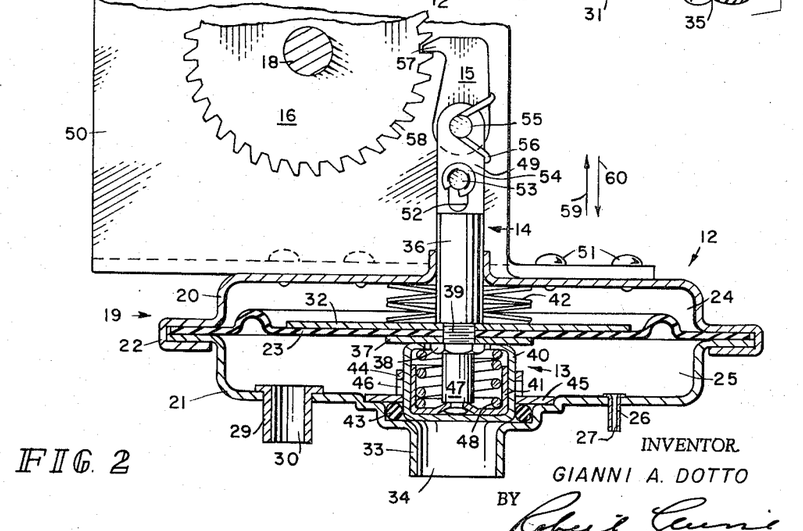
FIGURE 2 is a fragmentary cross sectional view taken across lines 2—2 of FIGURE 1 showing a fluid sensitive diaphragm means and associated valve means in their respective initial positions.

The pressure sensitive means 12 comprises a housing or casing 19 having an upper cup-like body section 20 open at its lower extremity and a lower cup-like body section 21 open at its upper extremity. The upper section has an edge 22 circumjacent its outer periphery which is crimped or rolled over an annular shoulder of the lower section so as to clinch the upper section, the lower section, and a periphery displaceable fluid sensitive means 23 securely in place with respect each to the other. It is seen that the lower extremity of the upper cup-like body section is closed effectively by the lower cup-like body section. The housing 19 may be manufactured from any suitable material, but preferably both of the cup-like body sections are fabricated from a sheet metal stamping.

A displaceable fluid sensitive means such as a resilient diaphragm 23 is positioned within housing 19 so as to extend laterally thwartwise the interior cross section of the housing to partition the housing into two separate and distinct chambers. The first chamber is shown as 25 and the second chamber is shown as 24.

A first intake fluid flow orifice 26 is interfitted with the first cup-like body section 21 by either pressure fitting, welding, or soldering in an off center location in the first body section. Intake fluid flow orifice 26 includes an aperture 27 extending its entire cross sectional length. A tubing 28 is coupled to orifice 26 permitting a fluid flow present, if any, in the tubing to be transmitter from the tubing through aperture 27 in the intake orifice to first chamber 25. A second intake orifice 29 is interfitted in any off-center position with the lower cup-like body section 21. The second orifice may be securely held in place by any suitable means such as disclosed hereinbefore. Second intake orifice 29 has an aperture 30 extending its entire cross sectional length. Fluid conductive tubing coupled between orifice 29 and a fluid flow source permits a fluid flow, if any, to be transmitted by the tubing through aperture 30 in the second intake orifice to the first chamber of housing 19. It is seen that aperture 27 is of smaller cross sectional area than aperture 30. One or the other intake orifices, or if desired, both intake orifices may be coupled concurrently to the fluid flow source. The combination utilized depends on the rate at which it is desired that the fluid be introduced to the first chamber.

A rigid disc 32, smaller in diameter than diaphragm 23, overlies the central portion of diaphragm 45. The rigid disc is secured in position by follower means 14. The purpose of rigid disc 32 is to maintain the center portion of diaphragm 23 substantially flat thereby uniformly transmitting fluid pressure accumulated in the first chamber to the follower means 14. Rigid disc 32 is fabricated from any suitable material such as sheet metal stamping.

An exhaust fluid orifice 33 is interfitted with the lower cup-like section 21. The exhaust orifice may be either pressure fitted, weld, or soldered in position centrally of the lower body section. Exhaust orifice 33 has an aperture 34 extending its entire cross sectional length. An exhaust tubing 35 coupled to orifice 33 permits fluid present in the first chamber to be exhausted therethrough if valve means 13 is in the "open" condition.

As disclosed hereinbefore, follower means 14 projects through an aperture in the diaphragm yet is firmly coupled to the diaphragm. The follower means comprises a rod 36 that projects through the centrally located aperture of the rigid disc 32 and the centrally located aperture of diaphragm 23, a washer 37 that underlies the diaphragm, and a nut 38 that underlies washer 37. Nut 38 mates with threaded portion 39 of rod 36 so as to tighten washer 37 against the diaphragm. FIGURE 2 shows that the normal diameter of rod is larger than the diameter of the threaded portion of the rod. Diaphragm 23 is firmly retained between disc 32 and washer 37 as nut 38 is tightened against the washer. By so doing, it is seen that horizontal movement of diaphragm 23 causes a proportional displacement of rod 36 in the horizontal direction.

Figures 4, 5:
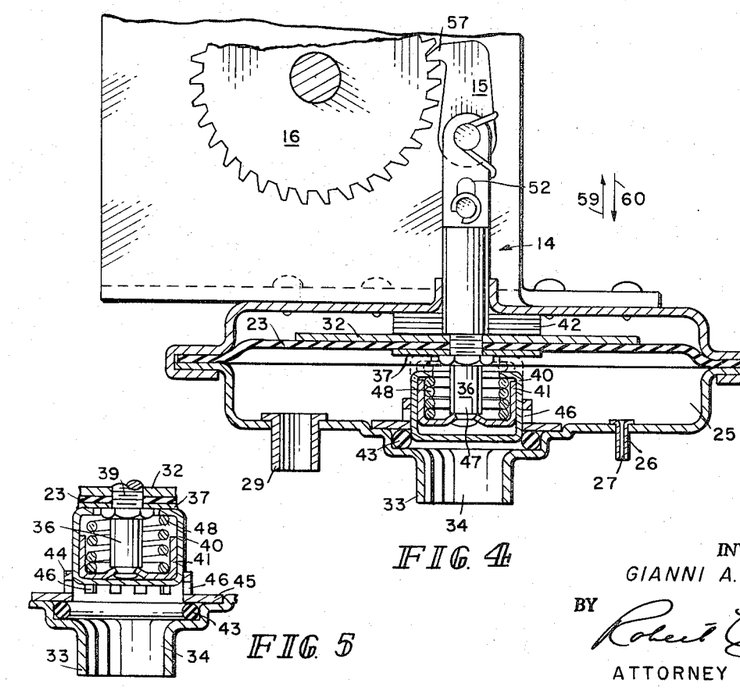
FIGURE 4 is a fragmentary cross sectional view of the movement of the valve means in full and dotted lines respectively.
FIGURE 5 is a cross sectional view of the valve means illustrating the maximum deflection of the valve means in the horizontal direction.

Valve means 13 is positioned so as to underlie washer 37, interfit with rod 36, and be seated in aperture 34 of fluid exhaust orifice 33. The valve means comprises a hollow cylinder 40, a cup 41 that slidably interfits with the hollow cylinder, and a cone disk snap ring 42 or coil spring. FIGURE 2 illustrates the initial or "closed" position of valve means 13. The diameter of hollow cylinder 40 is greater than the diameter of aperture 34, therefore, when the hollow cylinder is positioned so as to overlie the aperture, fluid present within first chamber 25 cannot be discharged through the exhaust orifice. To insure a leak proof seal between the exhaust orifice and the first chamber, a resilient ring 43 fabricated of rubber or other suitable material forms a seal between the first chamber and the exhaust orifice when the valve means is in its initial or "closed" position as shown in FIGURE 2. A metallic ring 44 including therewith flange 45 interfits with hollow cylinder 40 and overlies ring 43 so as to fixedly position the ring within the first chamber. Metallic ring 44 has about its vertical periphery a plurality of predeterminately spaced horizontal apertures 46. The apertures 46 permit fluid to flow therethrough to the exhaust orifice when the valve means is horizontally displaced as shown in FIGURE 5.

Slidably mounted within hollow cylinder 40 is cup 41. Cup 41 is fixedly coupled to extremity 47 of rod 36 by any suitable means such as by welding, a rivet, or by soldering. It is seen that any horizontal displacement of rod 36 will cause cup 41 to be displaced in a like manner in the corresponding horizontal direction. A coil spring 42 interfitting with cup 41 and abutting the inner extremity of hollow cylinder 40 biases cup 41, hollow cylinder 40, and rod 36 toward aperture 34 of the exhaust orifice. The cooperation of the valve means and the resilient ring, seal the first chamber from the exhaust orifice preventing a discharge of fluid, if any, from the first chamber.

The void second chamber 24 allows the diaphragm to be displayed therein by the fluid accumulated in the first chamber. As disclosed hereinafter, rod 36 projects through the second chamber and through the centrally positioned aperture. Interfitting with rod 36 is any suitable spring means 42 such as a plurality of concentric bellville washers or a coil spring. The spring means underlies the portion of the cup shaped upper section 20 through which rod 36 projects and overlies an area of rigid disc 32 surrounding the aperture through which the rod projects. It is seen therefore, that spring means 42 biases the rigid disc and the diaphragm toward the exhaust orifice. When the diaphragm is displaced from the exhaust orifice, the spring bias means is compressed as a result thereof, thereby storing energy to be released subsequently in a horizontal direction that would return the diaphragm to its initial location.

Housing 19 is fixedly coupled to mounting frame 50 by any suitable means such as a plurality of rivets 51. The mounting may be accomplished so that the longitudinal plane of the housing is perpendicular to the longitudinal plane of the mounting frame. As shown in FIGURE 1, this mounting of the housing allows easy access by the rod to the ratchet means 15 and the ratchet wheel 16.

As disclosed hereinbefore, rod 36 projects through and out of the second chamber 24 of housing 19. As illustrated in FIGURES 1–4 rod 36 terminates in a substantially flat portion 49. The flat portion 49 has cut therein a longitudinal slot 52, which slidably interfits with a slotted portion of cylindrical projection 53. The cylindrical projection is fixedly connected to mounting frame 50. A Tru-Arc Ring 54 press fitted with cylindrical projection 53 and overlies a segment of the substantially flat portion 49 so as to prevent deleterious vertical displacement of the rod.

Pivotally coupled to the extremity of the flat portion 49 by means of pin 55 is ratchet means 15. A spring 56 is used to bias ratchet 15 toward ratchet wheel 16. FIGURE 2 shows that toe 57 of ratchet 15 interfits with valley 58 of the ratchet wheel. As rod 36 is displaced in the direction of arrow 59, ratchet 15 is displaced in the same general direction. It is seen that toe 57 of the ratchet will ride up the sloping segment of the next frontward ratchet tooth or ratchet wheel 16 and will pivot slightly about pin 55 in so doing. Upon reaching the apex of the tooth, the toe will drop into the valley of the adjacent tooth. A stop pawl 17 prevents counterclockwise direction of ratchet wheel 16 by movement of ratchet 15 in the direction of arrow 59. When the fluid accumulated in the first chamber is allowed to exhaust through the exhaust orifice, rod 36 and ratchet 15 are returned to their respective initial positions. It is seen that rod 36 is displaced in the direction of arrow 60 upon the return of the rod to its initial position. In returning to its initial position, ratchet 15 actuates rachet wheel 16 in the clockwise direction and displaces the ratchet wheel a radial distance equal to approximately one ratchet tooth.

Ratchet wheel 16 is fixedly coupled to cam carrying shaft 18 by any suitable means. The cam carrying shaft has an extremity rotatably journalled to mounting frame 50 by any suitable means. Movement of the ratchet in the direction of arrow 60 is transferred to the ratchet wheel and to the cam carrying shaft. The cam carrying shaft retains thereon a plurality of switch actuating means or cams 11. The periphery of the cams incorporate coded indicia such as rise and fall contours. Each cam having coded indicia has at least one follower switch riding on the periphery thereof. The follower switch is actuated in accordance with the rise and fall contours of a cam's coded indicia has at least one follower switch riding terminative of the state of actuation of its associated follower switch.

Figure 3:
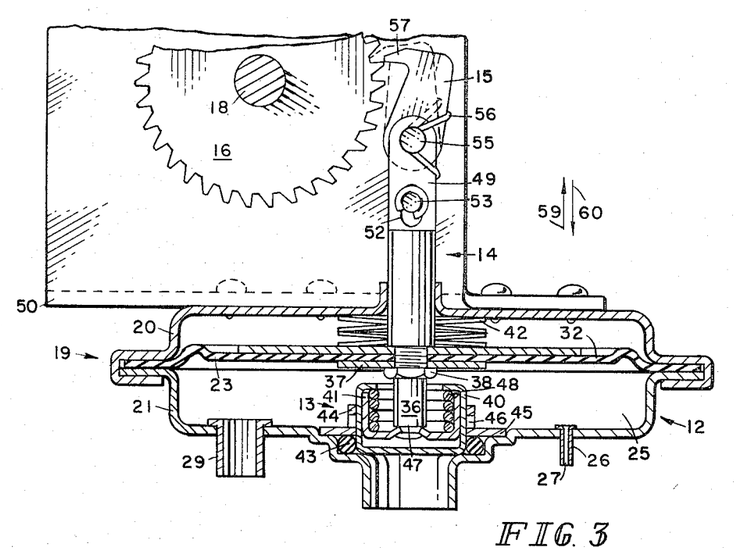
FIGURE 3 is a fragmentary cross sectional view taken across lines 2—2 of FIGURE 1 illustrating the fluid sensitive diaphragm means and associated ratchet means displaced in a horizontal direction.

In operation, the present invention functions as disclosed hereinafter. A constant flow of fluid, such as water, flows through either orifice 26 or through orifice 29 or through both orifices to first chamber 25. Initially, valve means 13 slidably seated in the entrance of orifice 33 prevents any discharge of accumulated fluid in the first chamber through the exhaust orifice. As fluid accumulates in the first chamber, diaphragm 23 is displaced in the direction of arrow 59. Rod 36, fixedly coupled to the diaphragm, is displaced in the direction of arrow 59. Cup 41 fixedly coupled to extremity 47 of the rod is displaced in the direction of arrow 59 thereby compressing spring bias means 48. As disclosed hereinbefore cup 41 is slidably interfitting with hollow cylinder 40, therefore, the hollow cylinder remains seated in position as cup 41 is initially displaced thereby preventing a discharge of the accumulated fluid through the exhaust orifice. Cup 41 continues to be displaced in the direction of arrow 59 as long as fluid accumulates within the first chamber. As the diaphragm and rigid disc are displaced in the direction of arrow 59, the diaphragm and the rigid disc function cooperatively to compress spring means 42. The aforemention displacement of the rod causes toe 57 of the ratchet to ride up the sloping portion of the next frontward ratchet tooth of ratchet wheel 16 as shown in FIGURE 3. Immediately prior to the descending of the toe into an adjacent valley, cup 41 engages hollow cylinder 40 as shown in FIGURE 3. The additional displacement of the rod required to drop the toe into the adjacent valley will displace the hollow cylinder from its initial position as shown in FIGURE 4. The displacement of the hollow cylinder breaks the seal between the hollow cylinder and the resilient sealing ring 43 thereby allowing a discharge of accumulated fluid through apertures 46 of metallic ring 44 to the exhaust orifice. A fluid pressure acting to displace the hollow cylinder further in the direction of arrow 59 is the direct result of the fluid discharge through the exhaust orifice. The pressure developed by the discharge of the accumulated fluid displaces the hollow cylinder and the cup in the direction of arrow 59 as shown by the dotted lines of FIGURE 4 and the full lines of FIGURE 5. The discharge of the accumulated fluid from the first chamber is accelerated for the valve means is now fully opened. The energy stored in spring 42 and the energy stored in spring bias means 48 act cooperatively to snap the rod in the direction of arrow 60 thereby displacing the ratchet wheel with a rapid motion in the clockwise direction. The arcuate displacement of the ratchet wheel is equal to approximately the distance between adjacent ratchet teeth. It is seen that valve means 13 is returned to its initial position thereby sealing the exhaust orifice from the pressure chamber preventing further discharge of fluid through the exhaust orifice.

FIGURES 6–9 illustrate a second embodiment of the present invention wherein a piston means 61 is substituted for the diaphragm 23 of the embodiment illustrated in FIGURES 1–5. The aforementioned substitution necessitates a modification of valve means 13 to insure dependable performance of the escapement device.

Figures 6, 7, 8, 9:
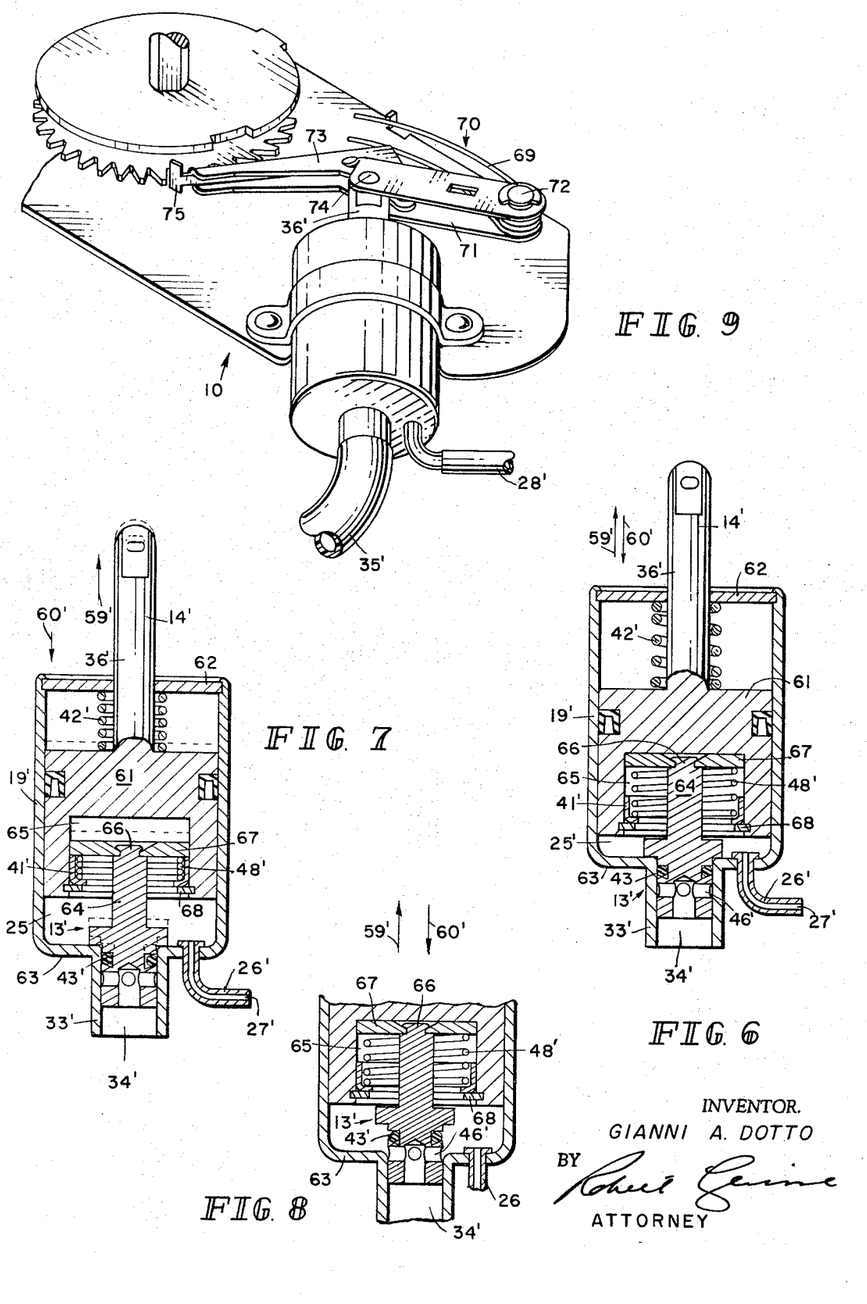
FIGURE 6 is a cross sectional view of another embodiment of the present invention illustrating the initial positions of a piston means and of an associated valve means.
FIGURE 7 is a cross sectional view illustrating the vertical displacement of the piston means and associated valve means in full and dotted lines respectively.
FIGURE 8 is a cross sectional view showing the various components of the valve means, the valve means displaced in the horizontal direction.
FIGURE 9 is a perspective view of another embodiment of the present invention illustrating the escapement means and associated switch actuating means.

Referring particularly to FIGURE 6, a housing 19' is utilized to house a valve means 13', a piston means 61, and a follower means 14'. Rod 36' of the follower means projects through extremity 62 of the housing and is coupled to ratchet means 15. The cooperation between the ratchet means and the ratchet wheel is as disclosed hereinbefore.

Extremity 63 of the housing has at least two orifices projecting therethrough. Intake orifice 26' couples a constant fluid flow source (not shown) to first chamber 25'. Exhaust orifice 33' projects through extremity 63 and in so doing provides a means whereby the fluid accumulated in the first chamber may be discharged. A valve means 13' is slidably seated partially within aperture 34' of the exhaust orifice. Valve means 13' has a projection 64 that extends into a recessed portion 65 of piston means 61. As shown in FIGURE 6 the recessed portion of the piston means is several times larger in cross sectional area than is the cross sectional area of valve projection 64. Extremity 66 of the valve projection is fixedly coupled to follower plate 67. The follower plate is slidably mounted within the recessed portion of the piston means. A ring 68 fabricated from any suitable metallic material is fixedly coupled to the piston means at the opening to the recessed portion 65. Ring 68 provides a seat for apertured cup 41'. A spring bias means 48' is positioned and is seated between the apertured cup and the slidable follower plate. It is seen that when a fluid flowing into first chamber 25' attains a predetermined accumulation and therefore exerts a pressure against piston means 61, the piston means is displaced in the direction of arrow 59' from its initial position. However, valve means 13' remains in its initial position as shown in FIGURE 7. Follower plate 67 remains in its initial position whereas apertured cup 41' is displaced in the direction of arrow 59' by metallic ring 68. It is seen that spring bias means 48' is compressed between follower plate 67 and the apertured cup. Coil spring 42' is compressed between the piston means and extremity 62 of the housing. A continuing flow of fluid into the first chamber will displace cup 41' sufficiently so as to engage the follower plate and hence displace the valve means in the direction of arrow 59'. When the piston and valve means are displaced to the dotted line portions of FIGURE 7, fluid leakage occurs from the first chamber between the resilient seal means 43' and the valve means to the exhaust orifice. The leakage lessens the fluid pressure exerted on the valve means thereby allowing the spring bias means 48' to release its stored energy thereby displacing valve means in the direction of arrow 59'. A plurality of apertures 46' integral with the valve means permit a rapid discharge of the accumulated fluid in the first chamber through the exhaust orifice. Upon discharge of the fluid from the first chamber, the energy stored by coil spring 42' is released thereby returning the piston means and the associated valve means to their respective initial positions as shown in FIGURE 6. Rod 36' fixedly coupled to the piston means is rapidly displaced in the direction of arrow 60' thereby actuating ratchet wheel 16 in the clockwise direction with a snap motion as disclosed hereinbefore.

FIGURE 9 illustrates an embodiment of the present invention not disclosed hereinbefore. The components contained within housing 19' are the same as disclosed in conjunction with the description of FIGURE 6 except that coil spring 42' has been removed and its function has been assumed by leaf spring 69. The components function in the manner as described in the disclosure associated with FIGURES 6–8. Rod 36' has its free extremity coupled to a knee action mechanism 70 in lieu of a ratchet means 15. The rod is coupled to a follower arm 71 such that a displacement of the rod in the direction of arrow 59' causes a corresponding displacement of the portion of the follower arm 71 to which the rod is coupled. As shown in FIGURE 9, follower arm 71 pivots about an axis as determined by retaining pin 72. Actuation of rod 36' in the direction of arrow 59' causes rigid arm 73 pivotably coupled to rod 36' and follower arm 71 by pin 74 to be pivoted about pin 74 in the clockwise direction. The pivoting in the clockwise direction of rigid arm 73 withdraws toe 75 of the rigid arm from a valley of the adjacent tooth in the counterclockwise direction. The movement outwardly by the rigid arm causes a leaf spring 69 to be displaced from its initial position, thereby accumulating and storing energy. As the fluid pressure is allowed to discharge through the exhaust orifice by means and methods disclosed thereon before, the energy stored by the leaf spring is released. The released energy acts in the direction of arrow 60' driving rod 36', rigid arm 73, and follower arm 71 back to their respective initial positions. During the return of the rigid arm to its initial position with respect to the follower arm, the ratchet wheel s driven in a clockwise direction equal to the angular distance of a ratchet tooth. Each cycle of the piston indexes a single tooth of the ratchet wheel which, in turn, imparts substantially the same incremental clockwise displacement to the cam carrying shaft.

Figures 10, 11, 12:
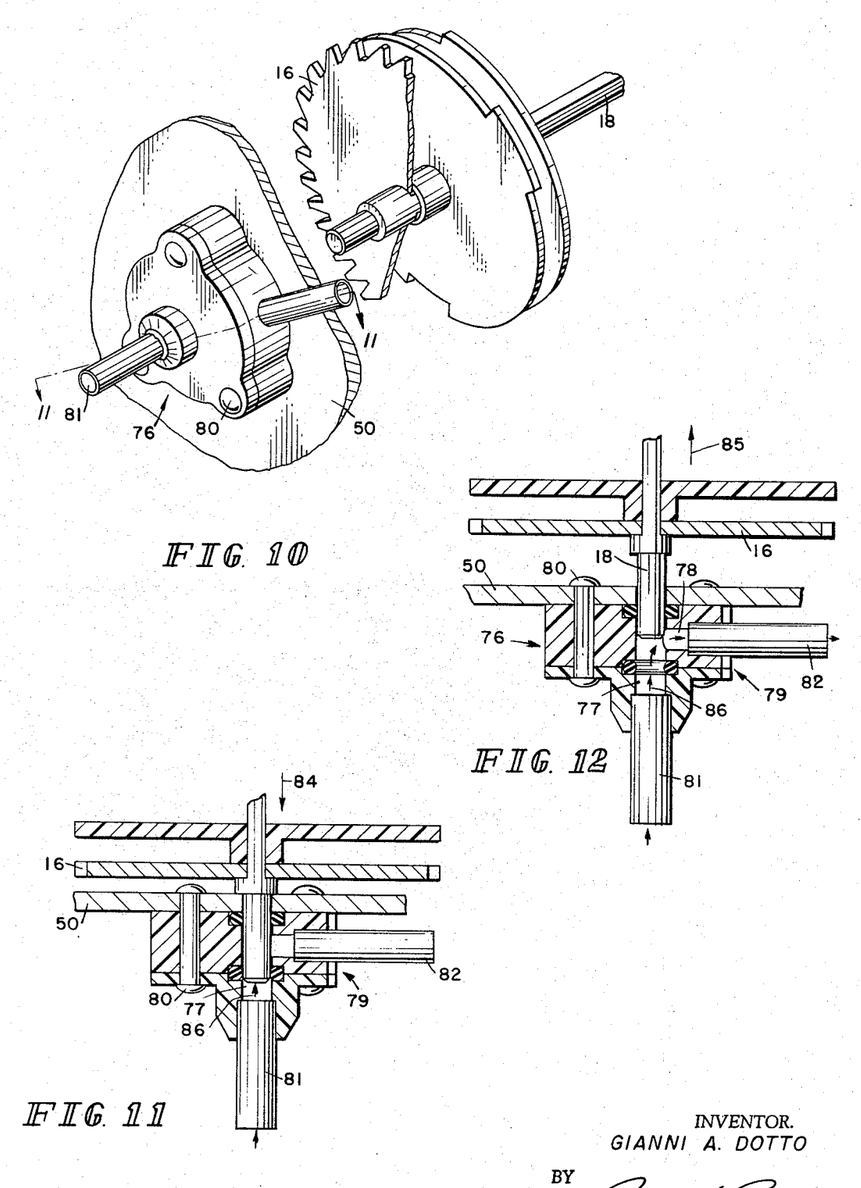
FIGURE 10 is a perspective view of a novel push-pull fluid switch and the cam carrying shaft.
FIGURE 11 is a fragmentary cross sectional view taken across the lines 11—11 of FIGURE 10 illustrating the "off" position of the push-pull fluid switch.
FIGURE 12 is a fragmentary cross sectional view taken across the lines 11—11 of FIGURE 10 illustrating the "on" position of the push-pull fluid switch.

FIGURES 10–12 illustrate yet another embodiment of the present invention. A fluid switch means 76 is fixedly coupled to the underside of mounting frame 50 by any suitable means such as by a plurality of rivets 80. It is seen from FIGURE 10 and more clearly seen from FIGURES 11 and 12 that cam carrying shaft 18 projects through the mounting frame and into a first segment of portion 77 of T-shaped aperture 78 of the fluid switch means. The housing 79 of the fluid switch means may be fabricated from any suitable material such as plastic or the like. Extending into a second segment of portion 77 of the T-shaped aperture is intake fluid tubing 81. Tubing 81 provides a means through which fluid from a source is carried from the fluid source (not shown) to the fluid switch. Exhaust fluid tubing 82 interfits with the stem on the T-shaped aperture to provide an exhaust for fluid flowing through the fluid switch. FIGURES 11 and 12 illustrate the position of at least a pair of rubber rings 83 used to seal the portion 77 when the cam carrying shaft is mating with one or both of rubber rings 83. FIGURE 11 shows the cam carrying shaft pushed into portion 77 as far as the shaft can be pushed. The direction of push is illustrated by arrow 84. In this position, hereinafter called the initial position, the cam carrying shaft mates with both rubber rings 83, the rubber rings positioned in portion 77 on either side of the stem of the T-shaped aperture. It is seen that in the initial position, the cam carrying shaft prevents the flow of fluid from the intake tubing to the exhaust tubing thereby severing the fluid source from the escapement means. When the cam carrying shaft is pulled in the direction of arrow 85 as shown in FIGURE 12, fluid is allowed to flow from the intake tube through a second segment of portion 77 to the exhaust tubing 82 and thence to the escapement means. The direction of fluid flow through the fluid switch is shown by a plurality of arrows 86. It is seen that the positioning of the cam carrying shaft with respect to the stem of the T-shaped aperture determines the magnitude of the opening between the intake tubing and the exhaust tubing and thereby regulates the fluid flow through the fluid switch to the escapement means. FIGURE 11 shows the fluid switch in the "off" position whereas FIGURE 12 shows the fluid switch in the maximum "on" position.

Figure 13:
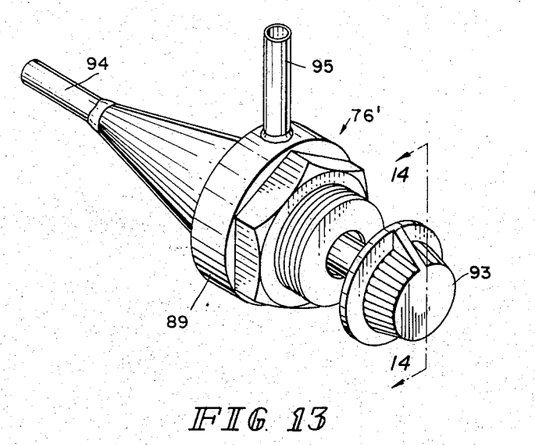
FIGURE 13 is a perspective view of a novel fluid switch incorporating a rotatable shaft.
Figure 14:
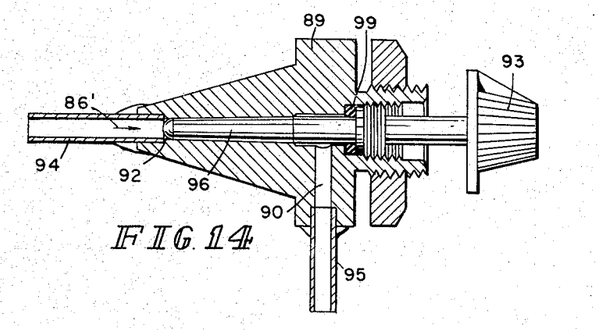
FIGURE 14 is a fragmentary cross sectional view taken across the lines 14—14 of FIGURE 13 illustrating the "off" position of the fluid switch.
Figure 15:
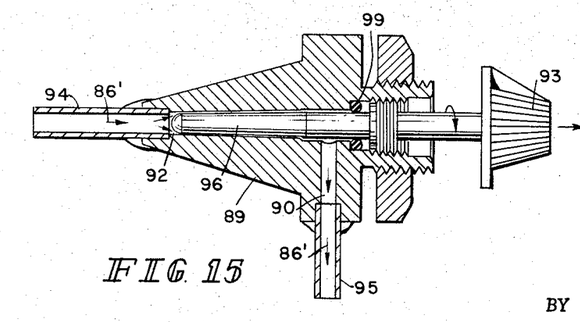
FIGURE 15 is a fragmentary cross sectional view taken across the lines 14—14 of FIGURE 13 illustrating the "on" position of the fluid switch.

FIGURES 13–15 illustrate still another embodiment of the present invention. A novel fluid switch means 76' comprises a housing 89, a T-shaped aperture 90 cut in the housing, a shaft 91 interfitting with longitudinally axial portion 92 of the T-shaped aperture, and a knob 93 coupled to an extremity of the shaft. A fluid intake tubing 94 is coupled to portion 92 of housing and is connected to a fluid source (not shown). A fluid exhaust tubing 95 is coupled to the stem portion of the T-shaped aperture. Segment 96 of shaft 91 interfitting with the longitudinal axial portion of the T-shaped aperture has its peripheral surface tapered so as to make an angle of approximately one degree with its longitudinally axis. A second portion of the shaft is threaded so as to interfit with the threaded portion of the T-shaped aperture.

FIGURE 14 shows the fluid switch means 76' in the closed or "off" position. It is seen that a fluid, such as water, is prevented from flowing to the exhaust tubing when the switch is in the off position. As the tapered shaft is backed out of portion 92 of the T-shaped aperture as shown by arrow 97 in FIGURE 15, fluid is allowed to flow from the intake tube to the exhaust tube in the direction of arrow 98. A sealing ring 99 prevents fluid leakage around the shaft in the direction of knob 93. As the tapered shaft is backed out of portion 92, the fluid flow is increased in accordance with the displacement of the shaft in the direction of arrow 97. It is seen that the positioning of tapered shaft within the T-shaped aperture 92 effectively regulates the rate of fluid flow between the intake tubing and the exhaust tubing of the fluid switch. Indicia may be affixed to knob 93 indicating the position of shaft 91 within portion 92 of the T-shaped aperture thereby pictorially displaying the rate of fluid flow through the fluid switch 76'. FIGURE 14 shows the fluid switch in the off position whereas FIGURE 15 shows the fluid switch in an "on" position.

Figures 16, 17:
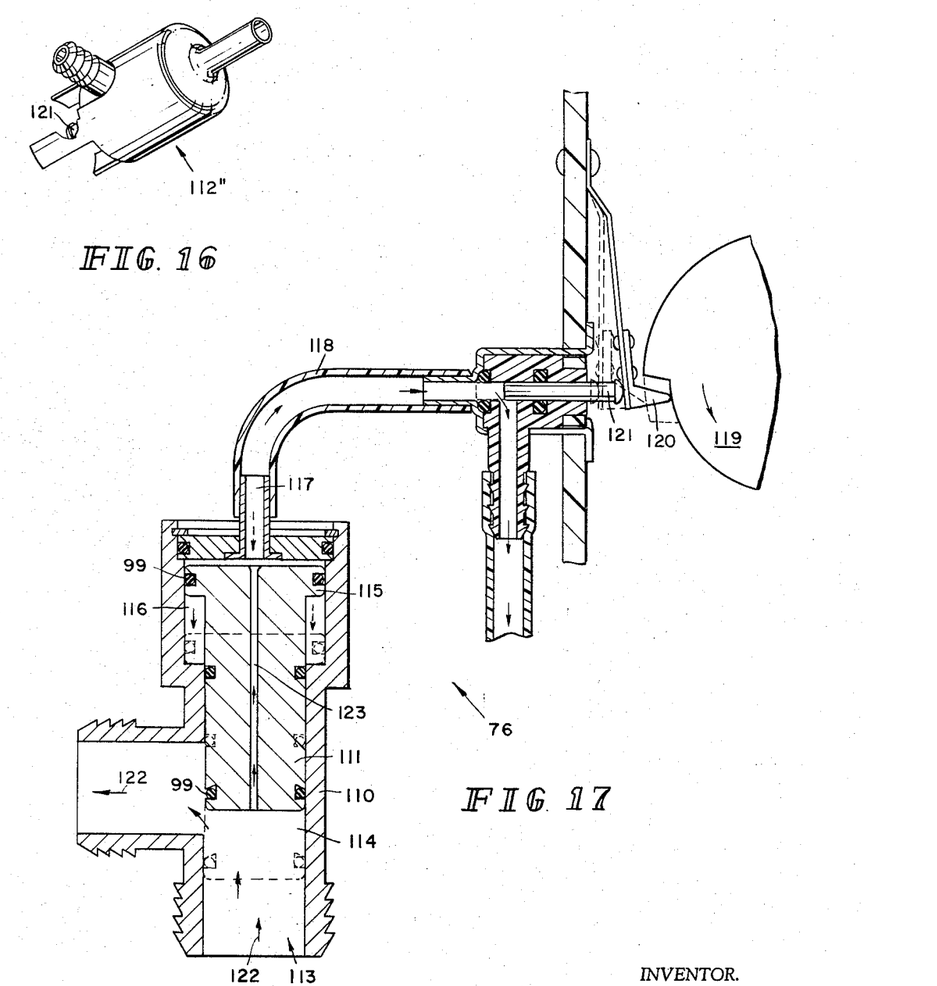
FIGURE 16 is a partial perspective view of a cam actuated means.
FIGURE 17 is a cross sectional view of the fluid switch of FIGURE 16 and cooperating cam actuated mechanism.

FIGURES 16 and 17 illustrate yet another embodiment of the novel fluid switch. A T-shaped housing 110, an apertured piston means 111, and a cam actuated means 112 combine to form a fluid switch means 76". The T-shaped housing 110 is apertured by T-shaped aperture 113. Slidably interfitting with portion 114 of the T-shaped aperture is apertured piston 111. Piston 111 includes flange 115 that slidably interfits with recessed portion 116 of the T-shaped aperture. The limits of the piston's displacement are shown in full and dotted lines respectively in FIGURE 17. The full lines show the fluid switch means on, that is, a fluid is permitted to flow through the fluid switch whereas the dotted lines show the portion of the piston when the fluid switch is off, that is, a fluid is not permitted to flow through the fluid switch. The plurality of seal rings 99 serve to prevent a fluid such as water from passing around the periphery of the piston means. An aperture 117 in the housing communicates with cam actuated means 112 through fluid conductive tubing 118.

The cam actuated means consists of a cam 119, a follower 120 that rides on the rise and fall contours of the cam, and a pin 121 that is actuated by follower 120 in accordance with the rise and fall contours of the cam. FIGURE 17 shows the movement of the cam, follower, and pin in full and dotted lines respectively. Referring to the full lines of FIGURE 17, fluid will flow through not only the intake and the exhaust portions of the T-shaped aperture as shown by arrows 122 but the fluid will also flow through the apertured portion of the piston means as shown by arrow 123. The fluid continues to flow through tubing 18, and through cam actuated means 112. When the cam, the follower, and the pin assume the dotted line position as shown in FIGURE 17, the fluid can no longer flow through the cam actuated means 112 for the pin seals tubing 118 thereby preventing fluid from flowing thereto. As disclosed hereinbefore, the fluid flow into the fluid switch means 76" is at a constant rate therefore fluid will accumulate in tubing 118 and in recess portion 116. It is seen that the recess portion 116 has a larger cross sectional area than that of portion 114. Therefore, as the fluid accumulates in the recessed portion, the pressure exerted downwardly on flange 115 of the piston due to the accumulation of fluid in recess 116 is greater than the upwardly exerted pressure on piston by the fluid flow into the switch. Piston 111 is displaced downwardly by additional fluid accumulated in recess 116 until the piston means assumes the position of the dotted lines thereby sealing the intake tubing from the exhaust tubing thus preventing a fluid flow through the switch. The fluid switch remains closed until such time as the pin is actuated to its initial or full line position. Upon actuation the tubing 118 and recess 116 is discharged through the cam actuated means. The pressure exerted by the fluid entering the fluid switch means is greater than the pressure exerted downwardly by the accumulated fluid remaining in recess 116, therefore the piston is displaced upwardly thereby allowing fluid to flow through the intake to the exhaust segments of the fluid switch means.

While the invention is illustrated and described in its preferred embodiments, it will be understood that modifications and variations may be effected without departing from the scope of the novel concepts of this invention as described and as set forth in the appended claims.

Having thus described my invention, I claim:

1. A fluid actuated escapement comprising: a housing; a diaphragm mounted in said housing and extending thereacross so as to define a first chamber on a first side of said diaphragm and to define a second chamber on a second side of said diaphragm; at least one aperture in said housing to said first chamber; said aperture communicating with a fluid flow; a second aperture in said housing to said second chamber; a follower means extending through said second aperture into said first chamber, said follower means fixedly coupled to said diaphragm, said follower means displaced from an initial position by said diaphragm as said diaphragm responds to said fluid flowing into said first chamber; bias means retained between said housing and said diaphragm and compressed therebetween storing energy therein as said diaphragm is displaced; and a valve means coupled to said follower means, said valve means comprising a hollow cylinder means, a cup means slidably interfitting with said cylinder means, said cup means fixedly coupled to said follower means, a spring bias means biasing said cup, said cup displaced with said follower means, said cup engaging said cylinder means after said cup is displaced a predetermined distance to thereafter displace said cylinder from an initial closed position with said first chamber to an open position, said fluid thereafter discharging from said first chamber through said open valve means releasing said energy stored by said bias means allowing said follower means to snap back to said initial position thereby closing said valve means, said follower means actuating a ratchet wheel through a predetermined arcuate displacement in accordance with said snap back motion of said follower means.

2. A fluid actuated escapement comprising: a housing; a piston means slidably mounted within said housing, said piston defining a first chamber on first side of said piston means and defining a second chamber on a second side of said piston means; at least one aperture in said housing to said first chamber, said aperture coupled to a fluid flow; a second aperture in said housing to said second chamber; a follower means extending through said second aperture and fixedly coupled to said piston means, said follower means displaced from an initial position by said piston means as said piston means responds to said fluid flow into said first chamber; bias means seated between said housing and said piston means and compressed therebetween storing energy therein as said piston means is displaced; a valve means coupled to said piston means, said valve means comprising an apertured means, a cup means interfitting with said apertured means, a spring bias means biasing said cup into engagement with said piston means, said cup displaced with said piston, said cup engaging said apertured means after said cup is displaced a predetermined distance to thereafter displace said apertured means from an initial closed position with said first chamber to an open position, said fluid thereafter discharging from said first chamber through said open valve means releasing said energy stored by said bias means allowing said follower means and said piston means to snap back to said initial position thereby closing said valve means, said follower means actuaitng a ratchet wheel through a predetermined arcuate displacement in accordance with said snap back motion of said follower means.

3. A fluid actuated escapement comprising a housing, a diaphragm mounted in said housing and extending thereacross so as to define a first chamber and a second chamber, an aperture formed in said first chamber communicating with a fluid flow, follower means extending through another aperture in said housing and fixedly coupled to said diaphragm, said diaphragm displacing said follower means from a normal position as said diaphragm is displaced by said fluid flowing into said first chamber, bias means retained between said housing and said diaphragm and compressed therebetween storing energy therein as said diaphragm is displaced, valve means coupled to said follower means and normally closing an exhaust aperture formed in said first chamber, said valve means comprising a hollow cylinder means having a closed end normally closing said exhaust aperture and cup means slidably interfitting with said cylinder means and fixedly coupled to and displaced with said follower means, said cup means engaging with said cylinder means after being displaced a predetermined distance by said follower means to thereafter displace said cylinder means from said normally closed position with said exhaust aperture to thereby open said exhaust aperture, said fluid discharging from said first chamber through said exhaust aperture, said bias means releasing said stored energy displacing said follower means with a snap action motion thereby causing said valve means to close said exhaust aperture, and ratchet wheel means actuated by said follower means through a predetermined arcuate displacement with a snap action motion as said follower means causes said valve to close.

4. A fluid actuated escapement comprising a housing, a diaphragm mounted in said housing and extending thereacross so as to define a first chamber and a second chamber, an aperture formed in said first chamber communicating with a fluid flow, follower means extending through another aperture in said housing and coupled to said diaphragm, a rigid disc overlying said diaphragm and fixedly coupled to said follower means, said diaphragm displacing said rigid disc and said follower means from a normal position as said diaphragm is displaced by said fluid flowing into said first chamber, bias means retained between said housing and said diaphragm and compressed therebetween storing energy therein as said diaphragm is displaced, valve means coupled to said follower means and normally closing an exhaust aperture formed in said first chamber, said valve means comprising a hollow cylinder means having a closed end normally closing said exhaust aperture and cup means slidably interfitting with said cylinder means and fixedly coupled to and displaced with said follower means, said cup means engaging with said cylinder means after being displaced a predetermined distance by said follower means to thereafter displace said cylinder means from said normally closed position with said exhaust aperture to thereby open said exhaust aperture, said fluid discharging from said first chamber through said exhaust aperture, said bias means releasing said stored energy displacing said follower means with a snap action motion thereby causing said valve means to close said exhaust aperture, and ratchet wheel means actuated by said follower means through a predetermined arcuate displacement with a snap action motion as said follower means causes said valve to close.

5. A fluid actuated escapement comprising a housing, a diaphragm mounted in said housing and extending thereacross so as to define a first chamber and a second chamber, an aperture formed in said first chamber communicating with a fluid flow, follower means extending through another aperture in said housing and fixedly coupled to said diaphragm, said diaphragm displacing said follower means from a normal position as said diaphragm is displaced by said fluid flowing into said first chamber, bias means retained between said housing and said diaphragm and compressed therebetween storing energy therein as said diaghragm is displaced, valve means coupled to said follower means and normally closing an exhaust aperture formed in said first chamber, said valve means comprising a hollow cylinder means having a closed end normally closing said exhaust aperture and cup means slidably interfitting with said cylinder means and fixedly coupled to and displaced with said follower means, spring means retained by said cup means and said cylinder means, displacement of said cup means compressing said spring means storing energy therein, said cup means engaging with said cylinder means after being displaced a predetermined distance by said follower means to thereafter initiate displacement of said cylinder means from said normally closed position with said exhaust aperture, said spring means releasing said stored energy to thereby accelerate opening of said exhaust aperture, said fluid discharging from said first chamber through said exhaust aperture, said bias means releasing said stored energy displacing said follower means with a snap action motion thereby causing said valve means to close said exhaust aperture, and ratchet wheel means actuated by said follower means through a predetermined arcuate displacement with a snap action motion as said follower means causes said valve to close.

6. A fluid actuated escapement comprising a housing, a ratchet wheel, a diaphragm mounted in said housing and extending thereacross so as to define a first chamber and a second chamber, an aperture formed in said first chamber communicating with a fluid flow, follower means including a ratchet pivotally coupled thereto and engaged with a tooth of said ratchet wheel, said follower means extending through another aperture in said housing and fixedly coupled to said diaphragm, said diaphragm displacing said follower means from a normal position as said diaphragm is displaced by said fluid flowing into said first chamber causing said ratchet to engage with another tooth of said ratchet wheel without displacing said ratchet wheel, bias means retained between said housing and said diaphragm and compressed therebetween storing energy therein as said diaphragm is displaced, valve means coupled to said follower means and normally closing an exhaust aperture formed in said first chamber, said valve means comprising a hollow cylinder means having a closed end normally closing said exhaust aperture and cup means slidably interfitting with said cylinder means and fixedly coupled to and displaced with said follower means, said cup means engaging with said cylinder means after being displaced a predetermined distance by said follower means to thereafter displace said cylinder means from said normally closed position with said exhaust aperture to thereby open said exhaust aperture, said fluid discharging from said first chamber through said exhaust aperture, said bias means releasing said stored energy displacing said follower means with a snap action motion thereby causing said valve means to close said exhaust aperture, said ratchet wheel means actuated by said ratchet carried by said follower means through a predetermined arcuate displacement with a snap action motion as said follower means causes said valve to close.

7. A fluid actuated escapement comprising a housing, a ratchet wheel, a diaphragm mounted in said housing and extending thereacross so as to define a first chamber and a second chamber, an aperture formed in said first chamber communicating with a fluid flow, follower means including a ratchet pivotally coupled thereto and engaged with a tooth of said ratchet wheel, said follower means extending through another aperture in said housing and fixedly coupled to said diaphragm, said diaphragm displacing said follower means from a normal position as said diaphragm is displaced by said fluid flowing into said first chamber causing said ratchet to engage with another tooth of said ratchet wheel without displacing said ratchet wheel, bias means retained between said housing and said diaphragm and compressed therebetween storing energy therein as said diaphragm is displaced, valve means coupled to said follower means and normally closing an exhaust aperture formed in said first chamber, said valve means comprising a hollow cylinder means having a closed end normally closing said exhaust aperture and cup means slidably interfitting with said cylinder means and fixedly coupled to and displaced with said follower means, spring means retained by said cup means and said cylinder means, displacement of said cup means compressing said spring means storing energy therein, said cup means engaging with said cylinder means after being displaced a predetermined distance by said follower means to thereafter initiate displacement of said cylinder means from said normally closed position with said exhaust aperture, said spring means releasing said stored energy to thereby accelerate opening of said exhaust aperture, said fluid discharging from said first chamber through said exhaust aperture, said bias means releasing said stored energy displacing said follower means with a snap action motion thereby causing said valve means to close said exhaust aperture, said ratchet wheel means actuated by said ratchet carried by said follower means through a predetermined arcuate displacement with a snap action motion as said follower means causes said valve to close.

8. A water actuated escapement comprising a housing, a flexible sheet mounted in said housing and extending thereacross so as to define a first chamber and a second chamber, an aperture formed in said first chamber communicating with a constant water flow, follower means extending through another aperture in said housing and fixedly coupled to said flexible sheet, said flexible sheet displacing said follower means from a normal position as said flexible sheet is displaced by said water flowing into said first chamber, bias means retained between said housing and said flexible sheet and compressed therebetween storing energy therein as said flexible sheet is displaced, valve means coupled to said follower means and normally closing an exhaust aperture formed in said first chamber, said valve means comprising a hollow cylinder means having a closed end normally closing said exhaust aperture and cup means slidably interfitting with said cylinder means and fixedly coupled to and displaced with said follower means, said cup means engaging with said cylinder means after being displaced a predetermined distance by said follower means to thereafter displace said cylinder means from said normally closed position with said exhaust aperture to thereby open said exhaust aperture, said water discharging from said first chamber through said exhaust aperture, said bias means releasing said stored energy displacing said follower means with a snap action motion thereby causing said valve means to close said exhaust aperture, and ratchet wheel means actuated by said follower means through a predetermined arcuate displacement with a snap action motion as said follower means causes said valve to close.

9. A fluid actuated escapement comprising a housing, a diaphragm mounted in said housing and extending thereacross so as to define a first chamber and a second chamber, an aperture formed in said first chamber communicating with a fluid flow, follower means extending through another aperture in said housing and fixedly coupled to said diaphragm, said diaphragm displacing said follower means from a normal position as said diaphragm is displaced by said fluid flowing into said first chamber, bias means seated between said housing and said diaphragm and compressed therebetween storing energy therein as said diaphragm is displaced, valve means coupled to said follower means and normally closing an exhaust aperture formed in said first chamber, said valve means comprising a hollow cylinder means having a closed end normally closing said exhaust aperture and cup means slidably interfitting with said cylinder means and fixedly coupled to and displaced with said follower means, said cup means engaging with said cylinder means after being displaced a predetermined distance by said follower means to thereafter displace said cylinder means from said normally closed position with said exhaust aperture to thereby open said exhaust aperture, said fluid discharging from said first chamber through said exhaust aperture, said bias means releasing said stored energy displacing said follower means with a snap action motion thereby causing said valve means to close said exhaust aperture, a spring biased follower arm and a rigid arm hingedly coupled to said follower means, said follower means actuating said follower arm and said rigid arm storing energy therein, said follower arm and said rigid arm cooperating to actuate a ratchet wheel through a predetermined arcuate displacement in accordance with said snap action motion of said follower means.

10. A fluid actuated escapement comprising a housing, a diaphragm mounted in said housing and extending thereacross so as to define a first chamber and a second chamber, an aperture formed in said first chamber communicating with a fluid flow, a fluid switch coupled between said aperture and a fluid source for regulating said fluid flow to said first chamber, follower means extending through another aperture in said housing and fixedly coupled to said diaphragm, said diaphragm displacing said follower means from a normal position as said diaphragm is displaced by said fluid flowing into said first chamber, bias means retained between said housing and said diaphragm and compressed therebetween storing energy therein as said diaphragm is displaced, valve means coupled to said follower means and normally closing an exhaust aperture formed in said first chamber, said valve means comprising a hollow cylinder means having a closed end normally closing said exhaust aperture and cup means slidably interfitting with said cylinder means and fixedly coupled to and displaced with said follower means, said cup means engaging with said cylinder means after being displaced a predetermined distance by said follower means to thereafter displace said cylinder means from said normally closed postiion with said exhaust aperture to thereby open said exhaust aperture, said fluid discharging from said first chamber through said exhaust aperture, said bias means releasing said stored energy displacing said follower means with a snap action motion thereby causing said valve means to close said exhaust aperture, and ratchet wheel means actuated by said follower means through a predetermined arcuate displacement with a snap action motion when said follower means causes said valve to close.

11. A fluid actuated escapement comprising a housing, a piston means slidably mounted in said housing so as to define a first chamber and a second chamber, an aperture formed in said first chamber communicating with a fluid flow, follower means extending through another aperture in said housing and fixedly coupled to said piston means, said piston means displacing said follower means from a normal position as said piston means is displaced by said fluid flowing into said first chamber, bias means retained between said housing and said piston means and compressed therebetween storing energy therein as said piston means is displaced, valve means coupled to said piston means and normally closing an exhaust aperture formed in said first chamber, said valve means comprising an apertured means having an end normally closing said exhaust aperture and cup means interfitting with said apertured means, said cup means engaging with said apertured means after being displaced a predetermined distance by said piston means to thereafter displace said apertured means from said normally closed position with said exhaust aperture to thereby open said exhaust aperture, said fluid discharging from said first chamber through said exhaust aperture, said bias means releasing said stored energy displacing said piston means and said follower means with a snap action motion thereby causing said valve means to close said exhaust aperture, and ratchet wheel means actuated by said follower means through a predetermined arcuate displacement with a snap action motion as said follower means causes said valve to close.

12. A fluid actuated escapement comprising a housing, a piston means slidably mounted in said housing so as to define a first chamber and a second chamber, an aperture formed in said first chamber communicating with a fluid flow, follower means extending through another aperture in said housing and fixedly coupled to said piston means, said piston means displacing said follower means from a normal position as said piston means is displaced by said fluid flowing into said first chamber, bias means seated between said housing and said piston means and compressed therebetween storing energy therein as said piston means is displaced, valve means coupled to said piston means and normally closing an exhaust aperture formed in said first chamber, said valve means comprising an apertured means having an end normally closing said exhaust aperture and apertured cup means interfitting with said apertured means, plate means integrally connected to said apertured means, said cup means engaging with said plate means of apertured means after being displaced a predetermined distance by said piston means to thereafter displace said apertured means from said normally closed position with said exhaust aperture to thereby open said exhaust aperture, said fluid discharging from said first chamber through said exhaust aperture, said bias means releasing said stored energy displacing said piston means and said follower means with a snap action motion thereby causing said valve means to close said exhaust aperture, said ratchet wheel means actuated by said follower means through a predetermined arcuate displacement with a snap action motion as said follower means causes said valve to close.

13. A fluid actuated escapement comprising a housing, a piston means slidably mounted in said housing so as to define a first chamber and a second chamber, an aperture formed in said first chamber communicating with a fluid flow, follower means extending through another aperture in said housing and fixedly coupled to said piston means, said piston means displacing said follower means from a normal position as said piston means is displaced by said fluid flowing into said first chamber, bias means seated between said housing and said piston means and compressed therebetween storing energy therein as said piston means is displaced, valve means coupled to said piston means and normally closing an exhaust aperture formed in said first chamber, said valve means comprising an apertured means having an end normally closing said exhaust aperture and apertured cup means interfitting with said apertured means, plate means integrally connected to said apertured means, spring means retained between said plate means and said cup means, displacement of said cup means compressing said spring means storing energy therein, said cup means engaging with said plate means of apertured means after being displaced a predetermined distance by said piston means to thereafter initiate displacement of said apertured means from said normally closed position with said exhaust aperture, said spring means releasing said stored energy to thereby accelerate opening of said exhaust aperture, said fluid discharging from said first chamber through said exhaust aperture, said bias means releasing said stored energy displacing said piston means and said follower means with a snap action motion thereby causing said valve means to close said exhaust aperture, and ratchet wheel means actuated by said follower means through a predetermined arcuate displacement with a snap action motion as said follower means causes said valve to close.

14. A fluid actuated escapement comprising a housing, a ratchet wheel, a piston means slidably mounted in said housing so as to define a first chamber and a second chamber, an aperture formed in said first chamber communicating with a fluid flow, follower means including a ratchet pivotally coupled thereto and engaged with a tooth of said ratchet wheel, said follower means extending through another aperture in said housing and fixedly coupled to said piston means, said piston means diplacing said follower means from a normal position as said piston means is displaced by said fluid flowing into said first chamber causing said ratchet to engage with another tooth of said ratchet wheel without displacing said ratchet wheel, bias means retained between said housing and said piston means and compressed therebetween storing energy therein as said piston means is displaced, valve means coupled to said piston means and normally closing an exhaust aperture formed in said first chamber, said valve means comprising an apertured means having an end normally closing said exhaust aperture and cup means inter-fitting with said apertured means, said cup means engaging with said apertured means after being displaced a predetermined distance by said piston means to thereafter displace said apertured means from said normally closed position with said exhaust aperture to thereby open said exhaust aperture, said fluid discharging from said first chamber through said exhaust aperture, said bias means releasing said stored energy displacing said piston means and said follower means with a snap action motion thereby causing said valve means to close said exhaust aperture, said ratchet wheel means actuated by said ratchet carried by said follower means through a predetermined arcuate displacement with a snap action motion as said follower means causes said valve to close.

15. A fluid actuated escapement comprising a housing, a ratchet wheel, a piston means slidably mounted in said housing so as to define a first chamber and a second chamber, an aperture formed in said first chamber communicating with a fluid flow, follower means including a ratchet pivotally coupled thereto and engaged with a tooth of said ratchet wheel, said follower means extending through another aperture in said housing and fixedly coupled to said piston means, said piston means displacing said follower means from a normal position as said piston means is displaced by said fluid flowing into said first chamber causing said ratchet to engage with another tooth of said ratchet wheel without displacing said ratchet wheel, bias means retained between said housing and said piston means and compressed therebetween storing energy therein as said piston means is displaced, valve means coupled to said piston means and normally closing an exhaust aperture formed in said first chamber, said valve means comprising an apertured means having an end normally closing said exhaust aperture and apertured cup means interfitting with said apertured means, plate means integrally connected to said apertured means, spring means retained between said plate means and said cup means, displacement of said cup means compressing said spring means storing energy therein, said cup means engaging with said plate means of apertured means after being displaced a predetermined distance by said piston means to thereafter initiate displacement of said apertured means from said normally closed position with said exhaust aperture, said spring means releasing said stored energy to thereby accelerate opening of said exhaust aperture, said fluid discharging from said first chamber through said exhaust aperture, said bias means releasing said stored energy displacing said piston means and said follower means with a snap action motion thereby causing said valve means to close said exhaust aperture, and ratchet wheel means actuated by said follower means through a predetermined arcuate displacement with a snap action motion as said follower means causes said valve to close.

16. A fluid actuated escapement comprising a housing, a piston means slidably mounted in said housing so as to define a first chamber and a second chamber, an aperture formed in said first chamber communicating with a fluid flow, follower means extending through another aperture in said housing and fixedly coupled to said piston means, said piston means displacing said follower means from a normal position as said piston means is displaced by said fluid flowing into said first chamber, bias means seated between said housing and said piston means and compressed therebetween storing energy therein as said piston means is displaced, valve means coupled to said piston means and normally closing an exhaust aperture formed in said first chamber, said valve means comprising an apertured means having an end normally closing said exhaust aperture and cup means interfitting with said apertured means, said cup means engaging with said apertured means after being displaced a predetermined distance by said piston means to thereafter displace said apertured means from said normally closed position with said exhaust aperture to thereby open said exhaust aperture, said fluid discharging from said first chamber through said exhaust aperture, said bias means releasing said stored energy displacing said piston means and said follower means with a snap action motion thereby causing said valve means to close said exhaust aperture, and a hinged knee action means coupled to said follower means, said follower means actuating said knee action means storing energy therein, said knee action means actuating a ratchet wheel through a predetermined arcuate displacement in accordance with said snap action motion of said follower means.

References Cited
UNITED STATES PATENTS

| | | | |
|---|---|---|---|
| 1,863,075 | 6/1932 | Terry | 137—510 |
| 1,999,697 | 4/1935 | Kleckner et al. | 137—510 |
| 2,213,790 | 9/1940 | Wilkins | 137—510 |
| 2,630,181 | 3/1953 | Solum | 91—50 |
| 2,868,026 | 1/1959 | Finehout et al. | 74—128 |
| 2,980,076 | 4/1961 | Machlan et al. | 91—50 |
| 3,141,384 | 7/1964 | Hoffman | 91—50 |

MARTIN P. SCHWADRON, *Primary Examiner.*

ALAN COHAN, *Examiner.*

B. L. ADAMS, *Assistant Examiner.*